US010023490B2

(12) United States Patent
Okada

(10) Patent No.: US 10,023,490 B2
(45) Date of Patent: Jul. 17, 2018

(54) METHOD OF MANUFACTURING OPTICAL FIBER, OPTICAL FIBER MANUFACTURING APPARATUS, AND CONTROL APPARATUS THEREFOR

(71) Applicant: FUJIKURA LTD., Tokyo (JP)

(72) Inventor: Kenji Okada, Sakura (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 0 days.

(21) Appl. No.: 15/017,776

(22) Filed: Feb. 8, 2016

(65) Prior Publication Data

US 2016/0229734 A1 Aug. 11, 2016

(30) Foreign Application Priority Data

Feb. 10, 2015 (JP) ................................. 2015-024648

(51) Int. Cl.
*C03B 37/025* (2006.01)
*C03B 37/03* (2006.01)
(Continued)

(52) U.S. Cl.
CPC .... *C03B 37/0253* (2013.01); *C03B 37/02718* (2013.01); *C03B 37/03* (2013.01);
(Continued)

(58) Field of Classification Search
CPC ..................................... C03B 37/025–37/0256
See application file for complete search history.

(56) References Cited

U.S. PATENT DOCUMENTS 6,530,243 B1 3/2003 Kuwahara et al.
2004/0025541 A1* 2/2004 Yamada .............. C03B 37/0253
65/382
(Continued)

FOREIGN PATENT DOCUMENTS

CN 1458100 A 11/2003
CN 101467085 A 6/2009
(Continued)

OTHER PUBLICATIONS

Japanese Office Action for JP Application No. 2015-024648 dated Jul. 28, 2015.
(Continued)

*Primary Examiner* — Lisa L Herring
(74) *Attorney, Agent, or Firm* — Sughrue Mion, PLLC

(57) ABSTRACT

A method of manufacturing an optical fiber of the invention includes: preparing a direction changer; drawing the bare optical fiber from an optical fiber preform; providing a coated layer on a periphery of the bare optical fiber; obtaining an optical fiber by curing the coated layer; changing a direction of the bare optical fiber at a position between a bare-optical-fiber formation position and a coated-layer provision position; and measuring the outer diameter of the coated layer; and adjusting the length of the bare optical fiber from a drawing unit to a coating unit by controlling a position of the direction changer based on a measurement value of the outer diameter, the drawing unit forming the bare optical fiber, the coating unit providing the coated layer on the periphery of the bare optical fiber.

4 Claims, 9 Drawing Sheets

(51) Int. Cl.
*C03C 25/10* (2018.01)
*G02B 6/02* (2006.01)
*C03C 25/106* (2018.01)
*C03B 37/027* (2006.01)

(52) U.S. Cl.
CPC ........ *C03C 25/106* (2013.01); *G02B 6/02395* (2013.01); *C03C 2218/32* (2013.01); *Y02P 40/57* (2015.11)

(56) References Cited

U.S. PATENT DOCUMENTS

| | | | |
|---|---|---|---|
| 2009/0145168 A1* | 6/2009 | Orita | C03C 25/18 |
| | | | 65/384 |
| 2009/0217710 A1 | 9/2009 | Costello, III et al. | |
| 2016/0168008 A1* | 6/2016 | Bookbinder | C03B 37/02727 |
| | | | 428/364 |

FOREIGN PATENT DOCUMENTS

| | | |
|---|---|---|
| EP | 0727273 A1 | 8/1996 |
| EP | 2146233 A1 | 1/2010 |
| JP | 60-251145 A | 12/1985 |
| JP | 62-3037 A | 1/1987 |
| JP | 2010-510957 A | 4/2010 |
| JP | 5571958 B2 | 8/2014 |
| WO | 2008/066661 A2 | 6/2008 |

OTHER PUBLICATIONS

Japanese Notice of Allowance for JP Application No. 2015-024648 dated Nov. 4, 2015.
English Translation of JP S60-251145A published on Dec. 11, 1985. JP 560-251145A was filed with IDS on Feb. 8, 2016.
Communication dated Nov. 30, 2017 from the State Intellectual Property Office of the P.R.C. in counterpart Application No. 201610080038.3.

* cited by examiner

METHOD OF MANUFACTURING OPTICAL FIBER, OPTICAL FIBER MANUFACTURING APPARATUS, AND CONTROL APPARATUS THEREFOR

CROSS REFERENCE TO RELATED APPLICATIONS

This application claims priority from Japanese Patent Application No. 2015-024648 filed on Feb. 10, 2015, the contents of which are incorporated herein by reference.

BACKGROUND OF THE INVENTION

Field of the Invention

The present invention relates to a method of manufacturing an optical fiber, an optical fiber manufacturing apparatus, and a control apparatus that controls the manufacturing apparatus.

Description of the Related Art

Generally, in manufacture of an optical fiber, a method is employed which vertically and downwardly draws an optical fiber from an optical fiber preform along a linear pathway.

The overall height of the system thereof is limited and becomes a factor that affects the productivity of the manufacturing method.

Because the height of the system becomes a main factor that limits the productivity, it is necessary to ensure the distance of a bare optical fiber in the system which is required to sufficiently cool the bare optical fiber obtained by drawing it from an optical fiber preform.

The above-described limitation can be eased by construction of new facilities such as new buildings; however, a huge cost is necessary in order to ease the limitation, if improvement in productivity is required in the future, it will be necessary to construct new facilities at great expense.

As a method of easing the limitation, a method of using a direction changing device that includes a noncontact retention mechanism and changes the direction in which a drawn fiber is drawn is known.

This noncontact retention mechanism is a mechanism that contactlessly retains an object by using a pressure of fluid such as air, and a direction changer that is provided with this mechanism can change the direction, in which a bare optical fiber (bare fiber) is drawn, without being in contact with the bare optical fiber.

By using this direction changer, the direction of a bare optical fiber which is fiber-drawn a optical fiber preform along a first pathway can be changed into a direction along a second pathway (for example, refer to Japanese Patent No. 5571958 and Japanese Unexamined Patent Application, First Publication No. S62-003037).

Japanese Patent No. 5571958 discloses a method of manufacturing an optical fiber, which uses a direction changing device that changes the direction of a drawn fiber. The instrument has a groove into which an optical fiber is to be introduced, and the groove has an opening formed therein.

In this method, a gas that is introduced into the instrument is discharged through one flow inlet port, and a direction of an optical fiber is changed in a state where the optical fiber floats due to the pressure of the gas.

Japanese Unexamined Patent Application, First Publication No. S62-003037 discloses a direction changer, the direction changer has a guide groove that guides a bare optical fiber into, and gas outlet nozzles are formed on the bottom surface and both side surfaces of the guide groove (refer to Example and FIGS. 3 and 4).

In this manufacturing method using the direction changer, a direction of an optical fiber is changed due to the pressure of the gas blown from four outlet nozzles in a state where the optical fiber floats.

In order to stabilize an outer diameter (coating diameter) of a coated layer of an optical fiber, it is preferable to suitably control a temperature of a bare optical fiber.

According to the manufacturing methods disclosed in Japanese Patent No. 5571958 and Japanese Unexamined Patent Application, First Publication No. S62-003037, since the bare optical fiber is retained by the gas pressure in the direction changing device, it is possible to control the temperature of the bare optical fiber by use of the gas.

However, in the case of adjusting a temperature of the bare optical fiber by control of the amount of gas in the direction changing device, there is the following problem.

Particularly, there is a concern that the amount of flotation of the bare optical fiber is insufficient and a bare optical fiber thereby comes into contact with the inner surface of the groove of the direction changing device.

In the case where the bare optical fiber comes into contact with the direction changing device, the bare optical fiber is damaged, and there is a possibility that the strength of the bare optical fiber is degraded.

SUMMARY OF THE INVENTION

Some aspects of the invention were conceived in view of the above-described circumstances and have an object thereof to provide a method of manufacturing an optical fiber, an optical fiber manufacturing apparatus, and a control apparatus that controls the manufacturing apparatus, which can sufficiently ensure an amount of flotation of a bare optical fiber and can control a temperature of the bare optical fiber with a high level of accuracy.

A first aspect of the invention provides a method of manufacturing an optical fiber, including: preparing a direction changer, the direction changer including a guide groove and an outlet nozzle, the guide groove being configured to guide a bare optical fiber, the bare optical fiber being arranged along and introduced into the guide groove, the outlet nozzle being formed in the guide groove and being configured to cause the bare optical fiber to float; drawing the bare optical fiber from an optical fiber preform, thereby forming the bare optical fiber (drawing step); providing a coated layer made of a resin on a periphery of the bare optical fiber (coating step); obtaining an optical fiber by curing the coated layer (curing step); changing the direction of the bare optical fiber at a position between a position at which the bare optical fiber is formed (the position in the drawing step, a bare-optical-fiber formation position) and a position at which the coated layer is provided on the periphery of the bare optical fiber (the position in the coating step, a coated-layer provision position) by use of the direction changer; measuring an outer diameter of the coated layer; and adjusting the length of the bare optical fiber from a drawing unit to a coating unit by controlling the position of the direction changer based on a measurement value of the outer diameter, the drawing unit forming the bare optical fiber, the coating unit providing the coated layer on the periphery of the bare optical fiber.

A second aspect of the invention provides a method of manufacturing an optical fiber, including: preparing a direction changer, the direction changer including a guide groove and an outlet nozzle, the guide groove being configured to guide a bare optical fiber, the bare optical fiber being arranged along and introduced into the guide groove, the outlet nozzle being formed in the guide groove and being configured to cause the bare optical fiber to float; drawing the bare optical fiber from an optical fiber preform, thereby forming the bare optical fiber (drawing step); providing a coated layer made of a resin on a periphery of the bare optical fiber (coating step); obtaining an optical fiber by curing the coated layer (curing step); changing the direction of the bare optical fiber at the position between the position at which the bare optical fiber is formed (the position in the drawing step, a bare-optical-fiber formation position) and the position at which the coated layer is provided on the periphery of the bare optical fiber (the position in the coating step, a coated-layer provision position) by use of the direction changer; measuring the drawing velocity of the optical fiber; and adjusting the length of the bare optical fiber from a drawing unit to a coating unit by controlling the position of the direction changer based on a measurement value of the drawing velocity, the drawing unit forming the bare optical fiber, the coating unit providing the coated layer on the periphery of the bare optical fiber.

A third aspect of the invention provides a method of manufacturing an optical fiber, including: preparing a direction changer, the direction changer including a guide groove and an outlet nozzle, the guide groove being configured to guide a bare optical fiber, the bare optical fiber being arranged along and introduced into the guide groove, the outlet nozzle being formed in the guide groove and being configured to cause the bare optical fiber to float; drawing the bare optical fiber from an optical fiber preform, thereby forming the bare optical fiber (drawing step); providing a coated layer made of a resin on a periphery of the bare optical fiber (coating step); obtaining an optical fiber by curing the coated layer (curing step); changing the direction of the bare optical fiber at the position between the position at which the bare optical fiber is formed (the position in the drawing step, a bare-optical-fiber formation position) and the position at which the coated layer is provided on the periphery of the bare optical fiber (the position in the coating step, a coated-layer provision position) by use of the direction changer; measuring the temperature of the bare optical fiber; and adjusting the length of the bare optical fiber from a drawing unit to a coating unit by controlling the position of the direction changer based on a measurement value of the temperature, the drawing unit forming the bare optical fiber, the coating unit providing the coated layer on the periphery of the bare optical fiber.

A fourth aspect of the invention provides a control apparatus used in an optical fiber manufacturing apparatus, the manufacturing apparatus including: a drawing unit that forms a bare optical fiber by drawing the bare optical fiber from an optical fiber preform; a coating unit that provides a coated layer made of a resin on a periphery of the bare optical fiber; and a curing unit that cures the coated layer, the control apparatus including: one or more direction changers that change the direction of the bare optical fiber at the position between the drawing unit and the coating unit, each direction changer including a guide groove and an outlet nozzle, the guide groove being configured to guide the bare optical fiber, the bare optical fiber being arranged along and introduced into the guide groove, the outlet nozzle being formed in the guide groove and being configured to cause the bare optical fiber to float; a measurement unit that measures an outer diameter of the coated layer; and a controller that adjusts the position of the direction changers based on a measurement value of the outer diameter measured by the measurement unit, the controller controlling positions of the direction changers and thereby adjusting the length of the bare optical fiber from the drawing unit to the coating unit in accordance with the measurement value.

A fifth aspect of the invention provides a control apparatus used in an optical fiber manufacturing apparatus, the manufacturing apparatus including: a drawing unit that forms a bare optical fiber by drawing the bare optical fiber from an optical fiber preform; a coating unit that provides a coated layer made of a resin on a periphery of the bare optical fiber; and a curing unit that cures the coated layer, the control apparatus including: one or more direction changers that change the direction of the bare optical fiber at the position between the drawing unit and the coating unit, each direction changer including a guide groove and an outlet nozzle, the guide groove being configured to guide the bare optical fiber, the bare optical fiber being arranged along and introduced into the guide groove, the outlet nozzle being formed in the guide groove and being configured to cause the bare optical fiber to float; a measurement unit that measures the drawing velocity of the optical fiber; and a controller that adjusts the position of the direction changers based on a measurement value of the drawing velocity measured by the measurement unit, the controller controlling positions of the direction changers and thereby adjusting the length of the bare optical fiber from the drawing unit to the coating unit in accordance with the measurement value.

A sixth aspect of the invention provides a control apparatus used in an optical fiber manufacturing apparatus, the manufacturing apparatus including: a drawing unit that forms a bare optical fiber by drawing the bare optical fiber from an optical fiber preform; a coating unit that provides a coated layer made of a resin on a periphery of the bare optical fiber; and a curing unit that cures the coated layer, the control apparatus including: one or more direction changers that change the direction of the bare optical fiber at the position between the drawing unit and the coating unit, each direction changer including a guide groove and an outlet nozzle, the guide groove being configured to guide the bare optical fiber, the bare optical fiber being arranged along and introduced into the guide groove, the outlet nozzle being formed in the guide groove and being configured to cause the bare optical fiber to float; a measurement unit that measures a temperature of the bare optical fiber; and a controller that adjusts the position of the direction changers based on a measurement value of the temperature measured by the measurement unit, the controller controlling positions of the direction changers and thereby adjusting the length of the bare optical fiber from the drawing unit to the coating unit in accordance with the measurement value.

A seventh aspect of the invention provides an optical fiber manufacturing apparatus including: a control apparatus according to the above-described fourth aspect; a drawing unit that forms a bare optical fiber by drawing the bare optical fiber from an optical fiber preform; a coating unit that provide a coated layer made of a resin on a periphery of the bare optical fiber; and a curing unit that cures the coated layer.

An eighth aspect of the invention provides an optical fiber manufacturing apparatus including: a control apparatus according to the above-described fifth aspect; a drawing unit that forms a bare optical fiber by drawing the bare optical fiber from an optical fiber preform; a coating unit that provide a coated layer made of a resin on a periphery of the bare optical fiber; and a curing unit that cures the coated layer.

A ninth aspect of the invention provides an optical fiber manufacturing apparatus including: a control apparatus according to the above-described sixth aspect; a drawing unit that forms a bare optical fiber by drawing the bare optical fiber from an optical fiber preform; a coating unit that provide a coated layer made of a resin on a periphery of the bare optical fiber; and a curing unit that cures the coated layer.

Effects of the Invention

According to the aspects of the invention, since the path length of the bare optical fiber is adjusted by controlling the position of the direction changer based on a measurement value of an outer diameter of the coated layer an optical fiber production intermediate, the temperature of the bare optical fiber which is introduced into the coating unit is adjusted with a high level of accuracy, and it is possible to maintain the outer diameter of the coated layer within a constant range in the coating unit.

According to the aspects of the invention, since it is possible to adjust the temperature of the bare optical fiber without varying the flow rate of the gas discharged from the outlet nozzle in the direction changer, it is possible to avoid the bare optical fiber from being in contact with the inner side surface of the guide groove due to a lack of flotation of the bare optical fiber.

DETAILED DESCRIPTION OF THE INVENTION

Figure 1:
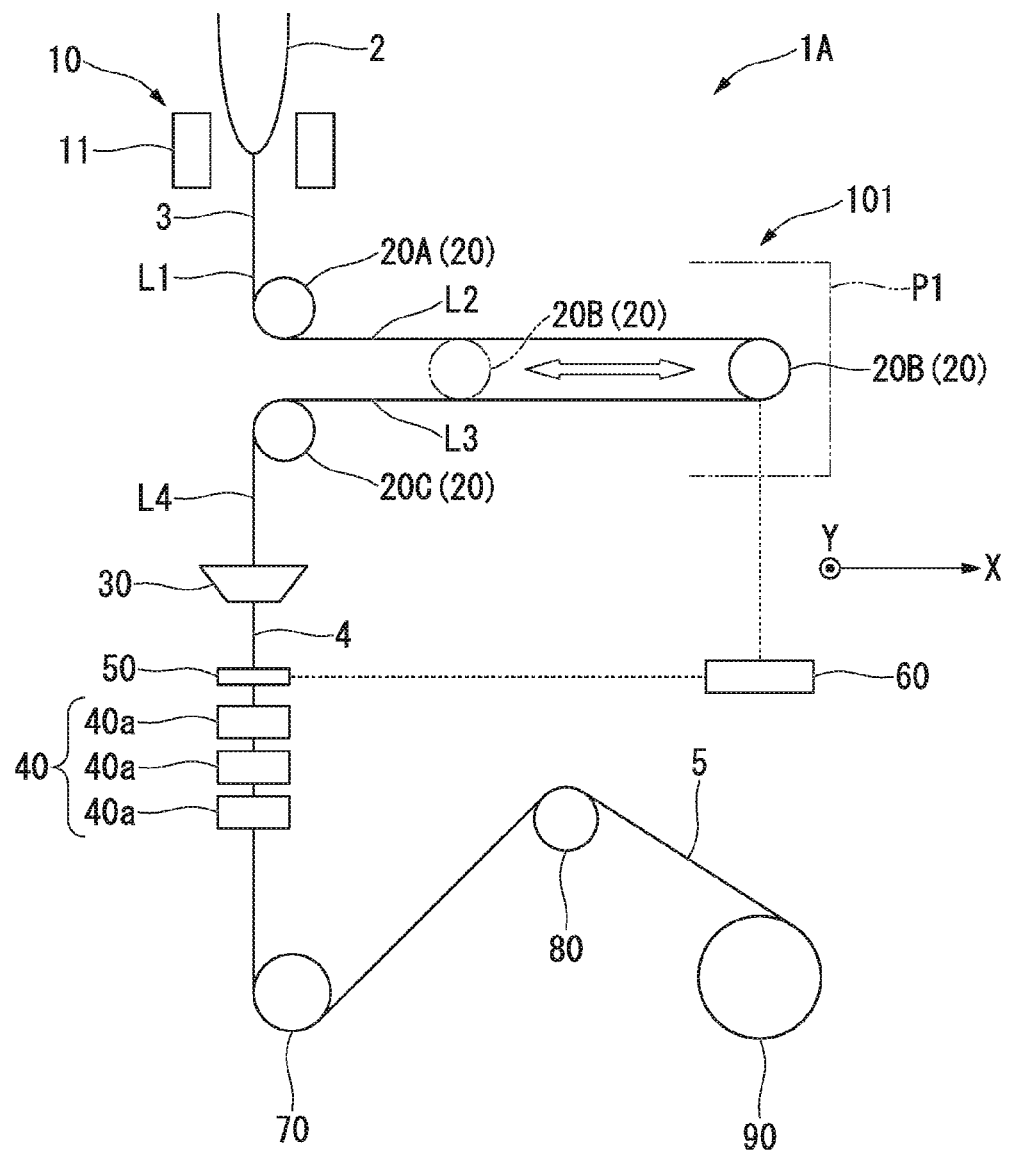
FIG. 1 is a schematic diagram showing the configuration of an optical fiber manufacturing apparatus according to a first embodiment of the invention.

FIG. 1 is a schematic diagram showing the configuration of a manufacturing apparatus 1A which serves as an optical fiber manufacturing apparatus according to a first embodiment of the invention.

The manufacturing apparatus 1A includes a drawing unit 10, direction changers 20 (20A, 20B, 20C), a coating unit 30, a curing unit 40, a measurement unit 50, a controller 60, a pick-up unit 70, a pulley 80, and a winding unit 90.

The direction changers 20, the measurement unit 50, and the controller 60 constitute a control apparatus 101.

The drawing unit 10 is provided with a heating furnace 11, an optical fiber preform 2 is heated by the heating furnace 11, and a bare optical fiber 3 is formed by drawing the heated preform.

The direction changers 20 change a direction of the bare optical fiber 3.

Three direction changers 20 are used in the manufacturing apparatus 1A.

The direction changers 20 are each referred to as a first direction changer 20A, a second direction changer 20B, and a third direction changer 20C in order from the upstream side to the downstream side in the fiber drawing direction.

The first direction changer 20A changes, by 90 degrees, the direction of the bare optical fiber 3 that is drawn from the optical fiber preform 2 in the downward vertical direction (first pathway L1), as a result, the direction of the bare optical fiber 3 is in the horizontal direction (second pathway L2).

A plane including the first pathway L1 and the second pathway L2 is referred to as P1.

The X-direction is the direction extending in the second pathway L2 in the plane P1 and the Y-direction is the direction perpendicular to the plane P1.

The second direction changer 20B changes the direction of the bare optical fiber 3 by 180 degrees, as a result, the direction of the bare optical fiber 3 is directed to the direction (third pathway L3) opposite to the second pathway L2.

The second direction changer 20B is movable in the direction in which the second direction changer comes close to or separates from the first direction changer 20A and the third direction changer 20C.

Particularly, the second direction changer 20B is movable in the X-direction.

The second direction changer 20B can move along a guide rail that extends in, for example, the X-direction by use of a driving device such as a motor.

The third direction changer 20C changes the direction of the bare optical fiber 3 by 90 degrees, as a result, the direction of the bare optical fiber 3 is in the downward vertical direction (fourth pathway L4).

The coating unit 30 is configured to coat (coating) the periphery of the bare optical fiber 3 with a coating material such as a urethane acrylate-based resin, thereby forms a coated layer, and an optical fiber production intermediate 4 is obtained.

The resin coating is, for example, a bilayer coating such that a material used to form a first coated layer having a lower Young's modulus is applied to the inside thereof and a material used to form a second coated layer having a higher Young's modulus is applied to the outside thereof.

The material used to form the resin coating is, for example, an ultraviolet curable resin.

The coating unit 30 may be configured to independently apply the first coated layer and the second coated layer or may be configured to simultaneously apply the first coated layer and the second coated layer.

The curing unit 40 is provided with one or more UV lamps 40a, is configured to cure the coated layer of the optical fiber production intermediate 4 and thereby form an optical fiber 5.

For example, the curing unit 40 includes UV lamps 40a which form a plurality of pairs thereof and are provided to sandwich spaces through which the optical fiber production intermediate 4 passes.

The measurement unit 50 can measure an outer diameter of the coated layer of the optical fiber production intermediate 4.

It is preferable that the measurement unit 50 can measure an outer diameter of the coated layer without coming in contact with the optical fiber production intermediate 4.

As the measurement unit 50, for example, a measurement device that includes a light source and a detector can be used.

By use of this measurement device, the light source (laser light source, or the like) that is provided at, for example, the side position of the optical fiber production intermediate 4 emits light thereto, the detector that is disposed to face the light source receives forward-scattered light from the optical fiber production intermediate, and an outer diameter of the optical fiber production intermediate 4 (that is, an outer diameter of the coated layer) is measured by analyzing a pattern of the received light or the intensity thereof.

The measurement unit 50 can be provided between the coating unit 30 and the curing unit 40.

The measurement unit 50 outputs a measurement signal to the controller 60 based on the measurement value of the outer diameter.

The controller 60 can control the position of the second direction changer 2013 (position in the X-direction) based on the measurement signal output from the measurement unit 50.

The controller 60 controls driving or stopping of, for example, the above-described driving device such as a motor and thereby can determine the position of the second direction changer 20B in the X-direction.

The optical fiber 5 is picked up by the pick-up unit 70, the pulley 80 changes the direction of the optical fiber, and the optical fiber is wound around the winding unit 90.

The pick-up unit 70 is, for example, a pick-up capstan, and the pick-up unit determines the drawing speed.

The drawing speed is greater than or equal to, for example, 1500 m/min.

The winding unit 90 is a bobbin that winds the optical fiber 5 therearound.

The outer diameter of the optical fiber preform 2 is greater than or equal to, for example, 100 mm, and the length of the optical fiber 5 manufactured from the optical fiber preform 2 is, for example, several thousands km.

Hereinbelow, configurations of a direction changer 20 will be described.

Figure 3:
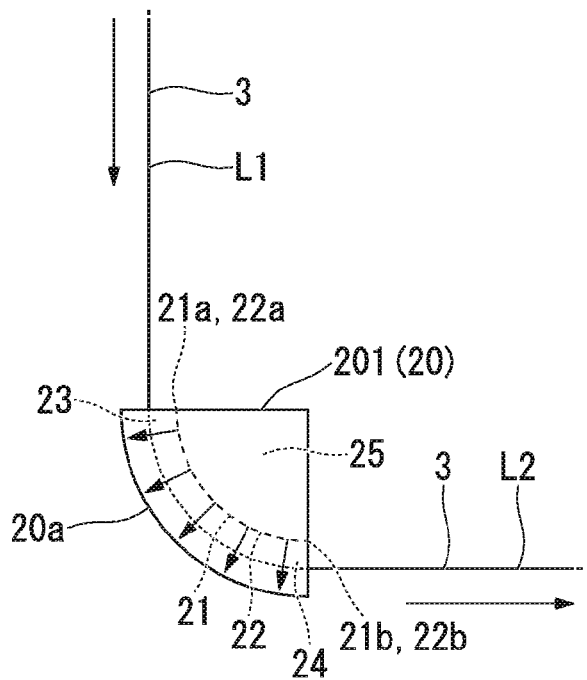
FIG. 3 is a front view showing a first example of the direction changer.

As shown in FIG. 3, a direction changer 201 is a first example of the direction changer 20 and can change a direction of the bare optical fiber 3 by 90 degrees.

The direction changer 201 is formed in a quarter-circular shape (arc) in plan view and has an outer peripheral face 20a and a guide groove 21. The guide groove 21 is formed on and along the entire periphery of the outer peripheral face 20a.

The center of the direction changer 201 coincides with the Y-direction, and the direction changer 201 is provided in the attitude in which the radial direction D1 (refer to FIG. 2) is in the direction along the plane P1 (refer to FIG. 1).

Here, the direction along the outer peripheral face 20a formed in a circular-arc shape in plan view is referred to as a circumferential direction.

An outlet nozzle 22 is formed at the bottom of the guide groove 21 and along the guide groove 21. The outlet nozzle blows fluid (e.g., air) into the guide groove, and the fluid (e.g., air) causes the bare optical fiber 3 which is arranged along and introduced into the guide groove 21 to float.

The outlet nozzle 22 is formed over the entire guide groove 21.

A first end 22a (one end) of the outlet nozzle 22 reaches a first end 21a (one end) of the guide groove 21, and a second end 22b (the other end) of the outlet nozzle 22 reaches a second end 21b (the other end) of the guide groove 21.

Figure 2:
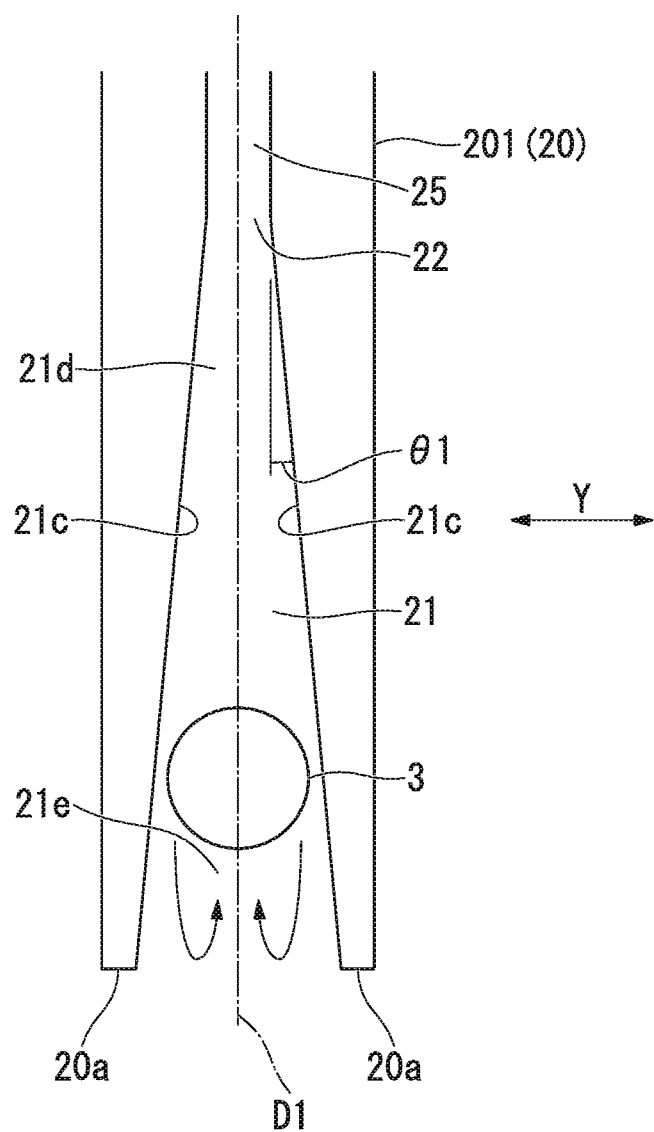
FIG. 2 is a cross-sectional schematic diagram showing the structure of a direction changer of the manufacturing apparatus shown in FIG. 1.

As shown in FIG. 2, the direction changer 201 is configured to be able to discharge fluid (for example, air) of the space (fluid reservoir 25) into the guide groove 21 through the outlet nozzle 22. The space is ensured in the direction changer 201.

The direction changer 201 can be configured to introduce the fluid into the fluid reservoir 25 from, for example, the outside and discharge the fluid into the guide groove 21 through the outlet nozzle 22.

It is preferable that the guide groove 21 be formed to be inclined with respect to the radial direction D1 so that the space (length in the Y-direction) between the inner side surfaces 21c thereof gradually increases in the radial-outer direction.

It is preferable that the inclination angles $\theta 1$ of the two inner side surfaces 21c with respect to the radial direction D1 are equal to each other.

In the direction changer 201 shown in FIG. 3, the bare optical fiber 3 enters the first end 21a of the guide groove 21 that is formed in a quarter-circular shape (arc) and exits from the second end 21b, and the direction of the bare optical fiber is thereby changed by 90 degrees.

A fiber inlet portion 23 to which the bare optical fiber 3 enters is a portion including the first end 21a of the guide groove 21, and a fiber outlet portion 24 from which the bare optical fiber 3 exits is a portion including the second end 21b of the guide groove 21.

Figure 4:
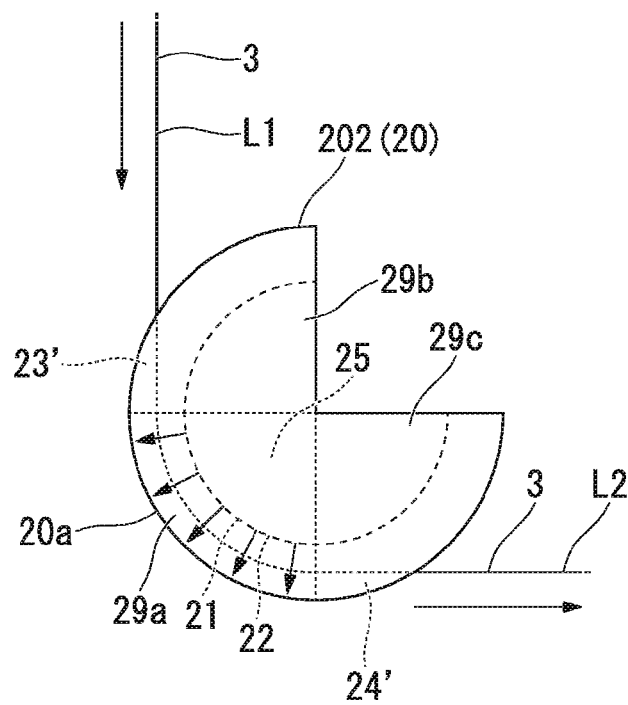
FIG. 4 is a front view showing a modified example of the direction changer of the first example shown in FIG. 3.

A direction changer 202 shown in FIG. 4 is a modified example of the direction changer 201 and is formed in a three-quarter-circular shape (arc) in plan view.

Hereinbelow, identical reference numerals are used for the elements which are identical to those of the above description, and the explanations thereof are simplified here.

The direction changer 202 is configured to include: a body part 29a having the same structure as that of the direction changer 201 shown in FIG. 3; and auxiliary parts 29b and 29c, each of which has the same structure as that of the body part 29a and which are consecutively connected to the incoming side and the outgoing side of the body part 29a.

Regarding the direction changer 202, the bare optical fiber 3 enters the guide groove 21 of the body part 29a through the fiber inlet portion 23', the direction of the bare optical fiber is changed by 90 degrees by the body part 29a, thereafter, the bare optical fiber exits from the body part through the fiber outlet portion 24'. Therefore, the basic function of the direction changer 202 is the same as that of the direction changer 201.

The direction changers 201 and 202 can change the direction of the bare optical fiber 3 by 90 degrees, and therefore can be used as the first direction changer 20A and the third direction changer 20C as shown in FIG. 1.

Figure 5:
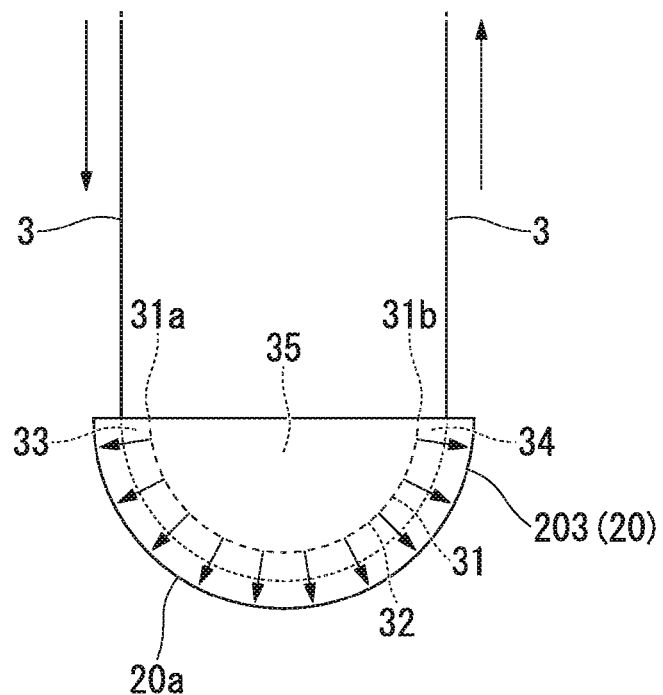
FIG. 5 is a front view showing a second example of the direction changer.

A direction changer 203 shown in FIG. 5 is a second example of the direction changer 20 and can change the direction of the bare optical fiber 3 by 180 degrees.

The direction changer 203 is formed in a semicircular shape in plan view and has an outer peripheral face 20a and a guide groove 31. The guide groove 31 is formed on and along the entire periphery of the outer peripheral face 20a.

An outlet nozzle 32 is formed at the bottom of the guide groove 31 and along the guide groove 31. The outlet nozzle blows fluid (e.g., air) into the guide groove, and the fluid (e.g., air) causes the bare optical fiber 3 to float.

The outlet nozzle 32 is formed over the entire guide groove 31.

The direction changer 203 is configured to be able to discharge fluid into the guide groove 31 through the outlet nozzle 32 from a fluid reservoir 35.

In the direction changer 203, the bare optical fiber 3 enters a first end 31a (one end) of the guide groove 31 of the semicircular shape and exits from a second end 31b (the other end) thereof, and the direction of the bare optical fiber is changed by 180 degrees.

A fiber inlet portion 33 is a portion including the second end 31a of the guide groove 31, and a fiber outlet portion 34 is a portion including the second end 3lb of the guide groove 31.

The cross-sectional configuration of the guide groove 31 is the same as that of the guide groove 21 (refer to FIG. 2).

Figure 6:
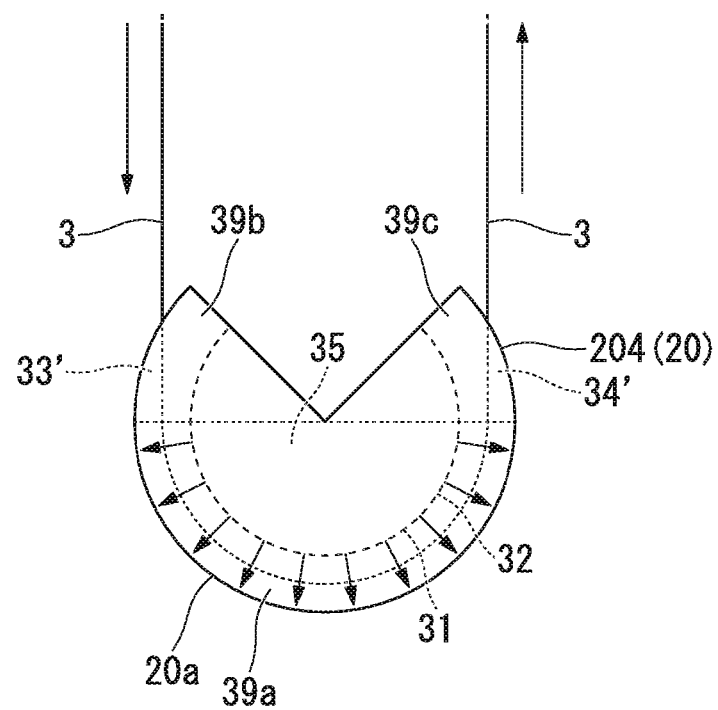
FIG. 6 is a front view showing a modified example of the direction changer of the second example shown in FIG. 5.

A direction changer 204 shown in FIG. 6 is a modified example of the direction changer 203 and is formed in a three-quarter-circular shape (arc) in plan view.

The direction changer 204 is configured to include: a body part 39a having the same structure as that of the direction changer 203 shown in FIG. 5; and auxiliary parts 39b and 39c, each of which has the same cross-sectional structure as that of the body part 39a, which are consecutively connected to the incoming side and the outgoing side of the body part 39a, and which are formed in a one-eighth circular shape (arc) in plan view.

Regarding the direction changer 204, the bare optical fiber 3 enters the guide groove 31 of the body part 39a through the fiber inlet portion 33', the direction of the bare optical fiber is changed by 180 degrees by the body part 39a, thereafter, the bare optical fiber exits from the body part through the fiber outlet portion 34'. Therefore, the basic function of the direction changer 204 is the same as that of the direction changer 203.

The direction changers 203 and 204 can change the direction of the bare optical fiber 3 by 180 degrees, and therefore can be used as the first direction changer 2013 as shown in FIG. 1.

Next, a method according to a first embodiment of the invention will be described which manufactures an optical fiber in the case of using, for example, the manufacturing apparatus 1A.

(Drawing Step)

In the drawing unit 10, the optical fiber preform 2 is heated and drawn, and the bare optical fiber 3 is formed.

(Direction Change by use of Direction Changer)

The direction of the bare optical fiber 3 that is drawn from the optical fiber preform 2 in the downward vertical direction (first pathway L1) is changed by 90 degrees by the first direction changer 20A, as a result, the direction of the bare optical fiber 3 is in the horizontal direction (second pathway L2).

The direction of the bare optical fiber 3 is changed by 180 degrees by the second direction changer 20B, as a result, the direction of the bare optical fiber 3 is directed to the direction (third pathway L3) opposite to the second pathway L2. The direction of the bare optical fiber 3 is changed by 90 degrees by the third direction changer 20C, as a result, the direction of the bare optical fiber 3 is in the downward vertical direction (fourth pathway L4).

In the direction changers 20A to 20C, as a result of discharging the fluid (for example, air) in the fluid reservoir 25 into the guide groove 21 through the outlet nozzle 22, it is possible to cause the bare optical fiber 3 to float.

Particularly, as shown in FIG. 2, since a difference in pressure between a deep portion 21d of the guide groove 21 and a shallow portion 21e thereof increases due to the discharged air, a force in the radial-outer direction of the direction changer is applied to the bare optical fiber 3, and the bare optical fiber 3 floats.

(Coating Step)

In the coating unit 30, the optical fiber production intermediate 4 is obtained by forming a coated layer by applying a coating material such as a urethane acrylate based resin onto the periphery of the bare optical fiber 3.

(Curing Step)

In the curing unit 40, the coated layer of the optical fiber production intermediate 4 is cured by irradiating the coating material with UV light by the UV lamp 40a or the like, and the optical fiber 5 is thereby formed.

(Adjustment of Path Length of Bare Optical Fiber 3)

The measurement unit 50 measures an outer diameter of the optical fiber production intermediate 4 (i.e., an outer diameter of the coated layer) and outputs a measurement signal to the controller 60 based on the measurement value.

The controller 60 controls the position of the second direction changer 20B in accordance with the measurement value of the outer diameter and thereby adjusts the path length of the bare optical fiber 3.

The path length of the bare optical fiber 3 is the length of the bare optical fiber 3 from the drawing unit 10 to the coating unit 30.

Particularly, in the case where the outer diameter of the coated layer increases, the controller 60 outputs a measurement signal corresponding to the measurement value, and the controller 60 disposes the second direction changer 20B at a position close to the first direction changer 20A and the third direction changer 20C.

As a control method, feedback control such as PID control is preferable.

Accordingly, it is possible to carry out control of the position of the second direction changer 20B with a high degree of responsiveness.

When the second direction changer 2013 approaches the first direction changer 20A and the third direction changer 20C, since the path length of the bare optical fiber 3 decreases accordingly, the temperature of the bare optical fiber 3 which is introduced into the coating unit 30 relatively increases.

In the case where the temperature of the bare optical fiber 3 increases, since the thickness of the coated layer formed in the coating unit 30 decreases due to physical properties of the coating material, the outer diameter of the coated layer decreases.

On the other hand, in the case where the outer diameter of the coated layer decreases, the controller 60 outputs a measurement signal corresponding to the measurement value, and the controller 60 disposes the second direction changer 20B at the position apart from the first direction changer 20A and the third direction changer 20C.

When the second direction changer 2013 moves separately from the first direction changer 20A and the third direction changer 20C, since the path length of the bare optical fiber 3 increases accordingly, the temperature of the bare optical fiber 3 which is introduced into the coating unit 30 relatively decreases.

In the case where the temperature of the bare optical fiber 3 decreases, since the thickness of the coated layer formed in the coating unit 30 increases, the outer diameter of the coated layer increases.

The optical fiber 5 is picked up by the pick-up unit 70, the direction of the optical fiber 5 is changed by the pulley 80, and the optical fiber 5 is wound around the winding unit 90.

According to the manufacturing method, since the path length of the bare optical fiber 3 is adjusted by controlling the position of the second direction changer 20B based on the measurement value of the outer diameter of the coated layer of the optical fiber production intermediate 4, the temperature of the bare optical fiber 3 which is introduced into the coating unit 30 is adjusted with a high level of accuracy, and it is possible to maintain the outer diameter of the coated layer within a constant range in the coating unit 30.

According to the manufacturing method, it is possible to adjust the temperature of the bare optical fiber 3 without varying the flow rate of the gas discharged from the outlet nozzle 22 in the direction changers 20A to 20C.

Therefore, it is possible to avoid the bare optical fiber 3 from being in contact with the inner side surface 21c of the guide groove 21 due to a lack of flotation of the bare optical fiber.

Figure 7:
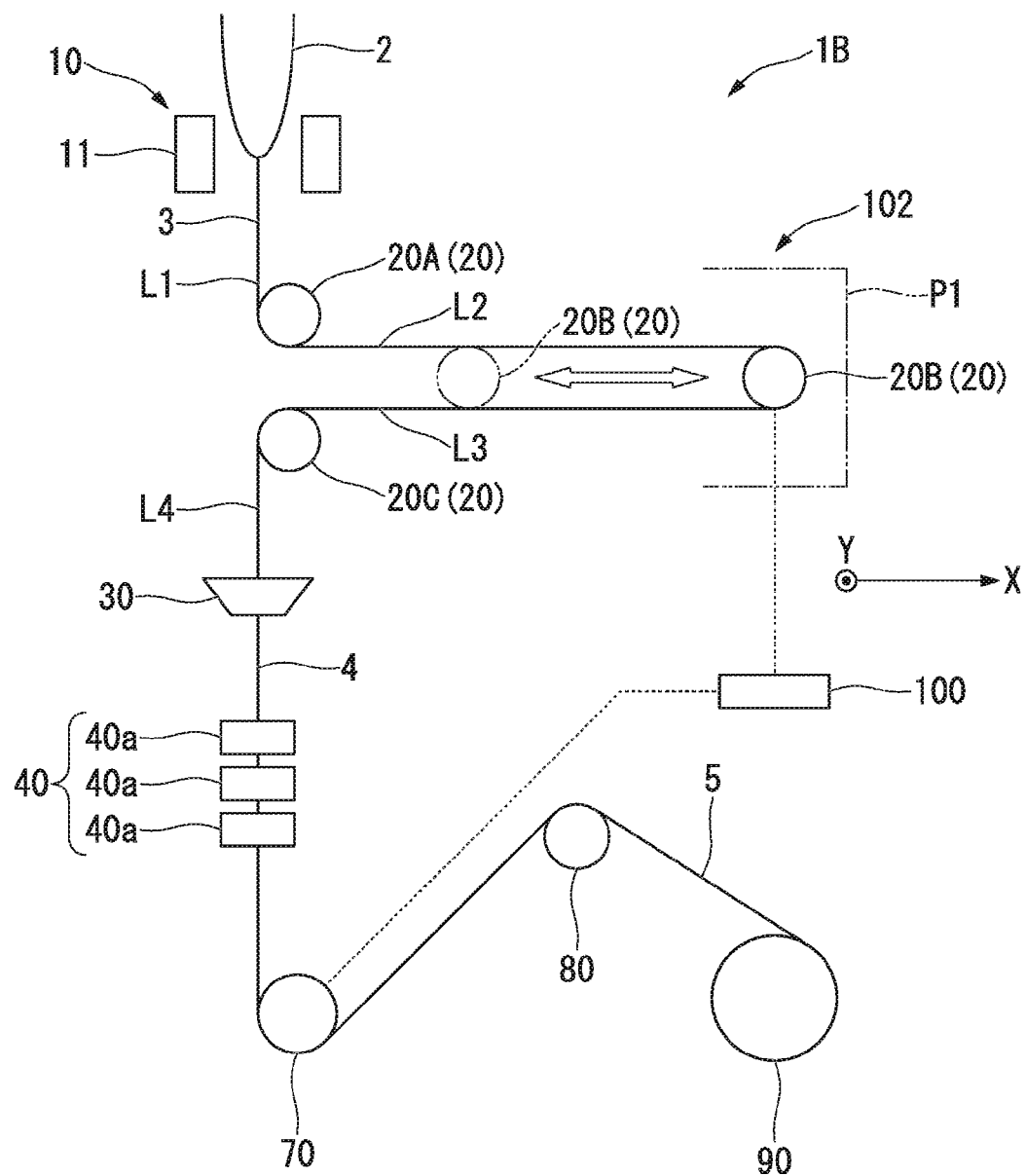
FIG. 7 is a schematic diagram showing the configuration of an optical fiber manufacturing apparatus according to a second embodiment of the invention.

FIG. 7 is a schematic diagram showing the configuration of a manufacturing apparatus 1B which serves as an optical fiber manufacturing apparatus according to a second embodiment of the invention. In FIG. 7, identical reference numerals are used for the elements which are identical to those of the above-described embodiment, and the explanations thereof are omitted or simplified here.

The manufacturing apparatus 1B includes the drawing unit 10, the direction changers 20 (20A, 20B, 20C), the coating unit 30, the curing unit 40, a controller 100, the pick-up unit 70, the pulley 80, and the winding unit 90.

The direction changers 20, the pick-up unit 70, and the controller 100 constitute a control apparatus 102.

The pick-up unit 70 serves as a measurement unit that measures a drawing velocity of the optical fiber 5.

The controller 100 can control the position of the second direction changer 2013 (position in the X-direction) based on the measurement signal output from the pick-up unit 70.

Next, a method according to a second embodiment of the invention will be described which manufactures an optical fiber in the case of using, for example, the manufacturing apparatus 1B.

The drawing step, the direction change by use of the direction changer, the coating step, and the curing step are the same as those of the above-described embodiments.

(Adjustment of Path Length of Bare Optical Fiber 3)

The pick-up unit 70 measures a drawing velocity of the optical fiber 5 and outputs a measurement signal to the controller 100 based on the measurement value.

The controller 100 controls the position of the second direction changer 2013 in accordance with the measurement value of the drawing velocity and thereby adjusts the path length of the bare optical fiber 3.

Particularly, in the case where the drawing velocity of the optical fiber 5 decreases, the controller 100 outputs a measurement signal corresponding to the measurement value, and the controller 100 disposes the second direction changer 20B at a position close to the first direction changer 20A and the third direction changer 20C.

As a control method, proportional control is preferable.

When the second direction changer 20B approaches the first direction changer 20A and the third direction changer 20C, since the path length of the bare optical fiber 3 decreases accordingly, the temperature of the bare optical fiber 3 which is introduced into the coating unit 30 relatively increases.

In the case where the temperature of the bare optical fiber 3 increases, since the thickness of the coated layer formed in the coating unit 30 decreases due to physical properties of the coating material, the outer diameter of the coated layer decreases.

On the other hand, in the case where the drawing velocity of the optical fiber 5 increases, the controller 100 outputs a measurement signal corresponding to the measurement value, and the controller 100 disposes the second direction changer 20B at the position apart from the first direction changer 20A and the third direction changer 20C.

When the second direction changer 20B moves separately from the first direction changer 20A and the third direction changer 20C, since the path length of the bare optical fiber 3 increases accordingly, the temperature of the bare optical fiber 3 which is introduced into the coating unit 30 relatively decreases.

In the case where the temperature of the bare optical fiber 3 decreases, since the thickness of the coated layer formed in the coating unit 30 increases, the outer diameter of the coated layer increases.

According to the manufacturing method, since the path length of the bare optical fiber 3 is adjusted by controlling the position of the second direction changer 20B based on the measurement value of the drawing velocity of the optical fiber 5, it is possible to maintain the outer diameter of the coated layer within a constant range in the coating unit 30.

According to the manufacturing method, since it is possible to adjust the temperature of the bare optical fiber 3 in the direction changers 20A to 20C without varying the flow rate of the gas, it is possible to avoid the bare optical fiber 3 from being in contact with the inner side surface 21c of the guide groove 21 due to a lack of flotation of the bare optical fiber.

Figure 8:
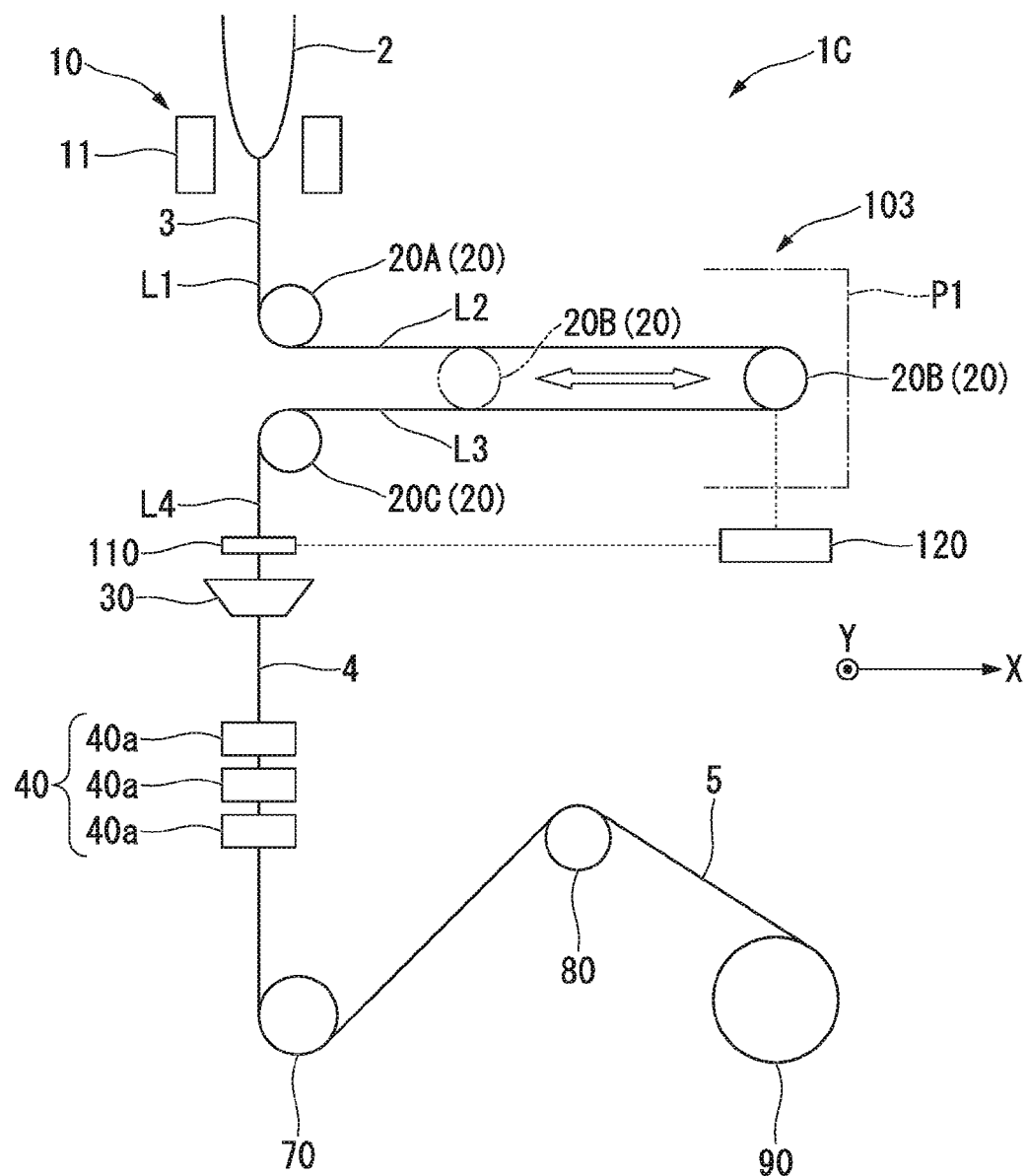
FIG. 8 is a schematic diagram showing the configuration of an optical fiber manufacturing apparatus according to a third embodiment of the invention.

FIG. 8 is a schematic diagram showing the configuration of a manufacturing apparatus 1C which serves as an optical fiber manufacturing apparatus according to a third embodiment of the invention. In FIG. 8, identical reference numerals are used for the elements which are identical to those of the above-described embodiments, and the explanations thereof are omitted or simplified here.

The manufacturing apparatus IC includes the drawing unit 10, the direction changers 20 (20A, 20B, 20C), the coating unit 30, the curing unit 40, a measurement unit 110, a controller 120, the pick-up unit 70, the pulley 80, and the winding unit 90.

The direction changers 20, the measurement unit 110, and the controller 120 constitute a control apparatus 103.

The manufacturing apparatus 1C is different from the manufacturing apparatus 1A shown in FIG. 1 in that the measurement unit 110 which measures a temperature of the bare optical fiber 3 is used instead of the measurement unit 50 which measures an outer diameter of the coated layer.

It is preferable that the measurement unit 110 can measure a temperature of the bare optical fiber 3 without coming in contact with the bare optical fiber 3.

The measurement unit 110 is, for example, a radiation thermometer.

The measurement unit 110 can be provided between the third direction changer 20C and the coating unit 30.

The controller 120 can control the position of the second direction changer 20B (position in the X-direction) based on the measurement signal output from the measurement unit 110.

Next, a method according to a third embodiment of the invention will be described which manufactures an optical fiber in the case of using, for example, the manufacturing apparatus IC.

The drawing step, the direction change by use of the direction changer, the coating step, and the curing step are the same as those of the above-described embodiments.

(Adjustment of Path Length of Bare Optical Fiber 3)

The measurement unit 110 measures a temperature of the bare optical fiber 3 and outputs a measurement signal to the controller 120 based on the measurement value.

The controller 120 controls the position of the second direction changer 20B in accordance with the measurement value of the temperature and thereby adjusts the path length of the bare optical fiber 3.

Particularly, in the case where the temperature of the optical fiber production intermediate 4 decreases, the controller 120 outputs a measurement signal corresponding to the measurement value, and the controller 120 disposes the second direction changer 20B at a position close to the first direction changer 20A and the third direction changer 20C.

As a control method, feedback control such as PID control is preferable.

When the second direction changer 20B approaches the first direction changer 20A and the third direction changer 20C, since the path length of the bare optical fiber 3 decreases accordingly, the temperature of the bare optical fiber 3 which is introduced into the coating unit 30 relatively increases.

In the case where the temperature of the bare optical fiber 3 increases, since the thickness of the coated layer formed in the coating unit 30 decreases, the outer diameter of the coated layer decreases.

On the other hand, in the case where the temperature of the optical fiber production intermediate 4 increases, the controller 120 outputs a measurement signal corresponding to the measurement value, and controller 120 disposes the second direction changer 20B at the position apart from the first direction changer 20A and the third direction changer 20C.

When the second direction changer 20B moves separately from the first direction changer 20A and the third direction changer 20C, since the path length of the bare optical fiber 3 increases accordingly, the temperature of the bare optical fiber 3 which is introduced into the coating unit 30 relatively decreases.

In the case where the temperature of the bare optical fiber 3 decreases, since the thickness of the coated layer formed in the coating unit 30 increases, the outer diameter of the coated layer increases.

According to the manufacturing method, since the path length of the bare optical fiber 3 is adjusted by controlling the position of the second direction changer 20B based on the measurement value of the temperature of the optical fiber production intermediate 4, it is possible to maintain the outer diameter of the coated layer within a constant range in the coating unit 30.

According to the manufacturing method, since it is possible to adjust the temperature of the bare optical fiber 3 in the direction changers 20A to 20C without varying the flow rate of the gas, it is possible to avoid the bare optical fiber 3 from being in contact with the inner side surface 21c of the guide groove 21 due to a lack of flotation of the bare optical fiber.

Figure 9:
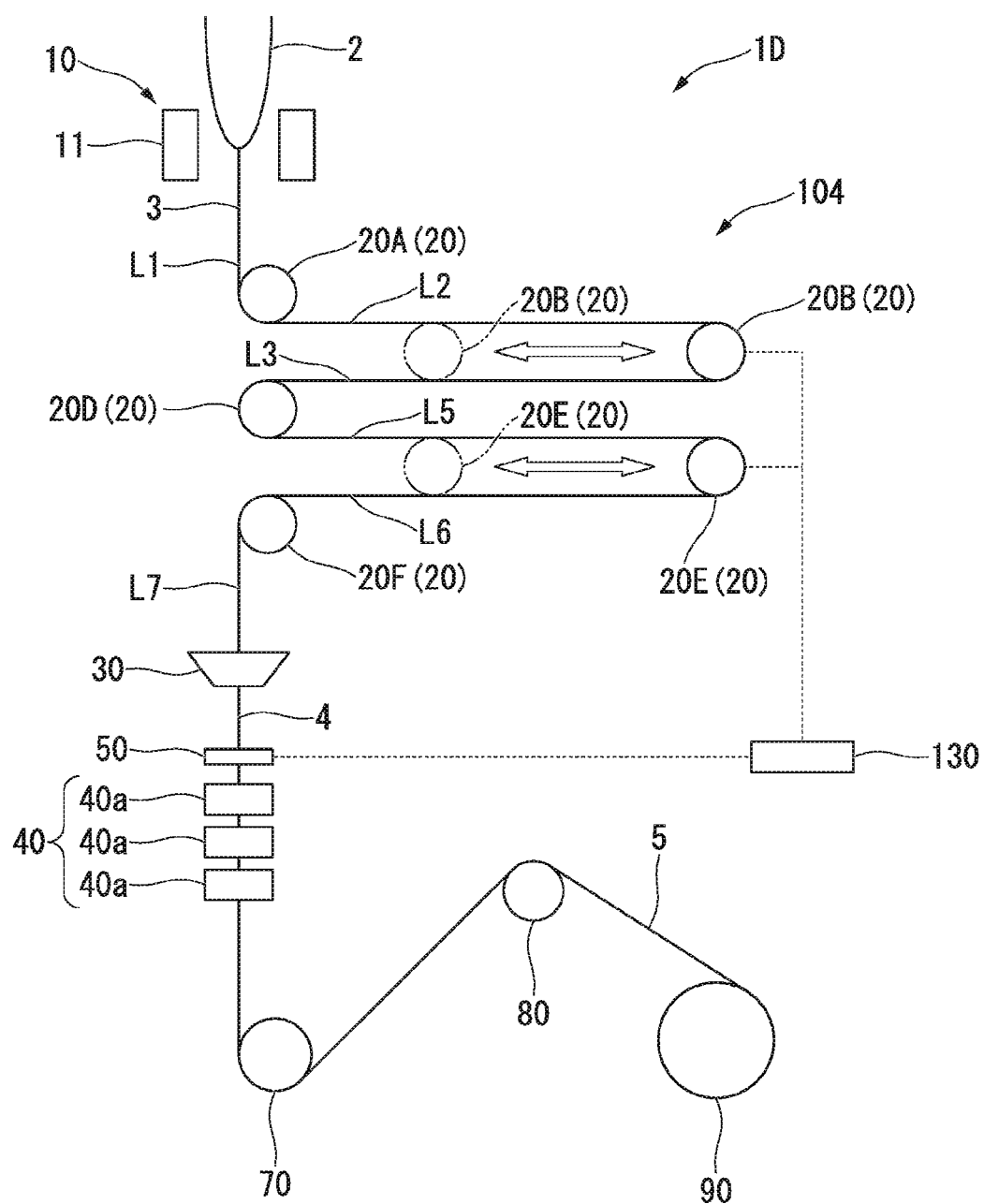
FIG. 9 is a schematic diagram showing the configuration of an optical fiber manufacturing apparatus according to a fourth embodiment of the invention.

FIG. 9 is a schematic diagram showing the configuration of a manufacturing apparatus 1D which serves as an optical fiber manufacturing apparatus according to a fourth embodiment of the invention. In FIG. 9, identical reference numerals are used for the elements which are identical to those of the above-described embodiments, and the explanations thereof are omitted or simplified here.

The manufacturing apparatus ID includes the drawing unit 10, the direction changers 20 (20A, 20B, 20D, 20E, 20F), the coating unit 30, the curing unit 40, a measurement unit 50, a controller 130, the pick-up unit 70, the pulley 80, and the winding unit 90.

The direction changers 20, the measurement unit 50, and the controller 130 constitute a control apparatus 104.

The manufacturing apparatus ID is different from the manufacturing apparatus 1A shown in FIG. 1 in that the manufacturing apparatus 1D includes a third direction changer 20D, a fourth direction changer 20E, and a fifth direction changer 20F.

The third direction changer 20D changes the direction of the bare optical fiber 3 extending in the horizontal direction (third pathway L3) by 180 degrees, as a result, the direction of the bare optical fiber 3 is directed to the direction (fourth pathway L5) opposite to the third pathway L3.

The fourth direction changer 20E changes the direction of the bare optical fiber 3 by 180 degrees, as a result, the direction of the bare optical fiber 3 is directed to the direction (fifth pathway L6) opposite to the fourth pathway L5.

The fourth direction changer 20E is movable in the direction in which the fourth direction changer comes close to or separates from the third direction changer 20D and the fifth direction changer 20F.

Particularly, the fourth direction changer 20E is movable in the X-direction.

The fourth direction changer 20E can move along a guide rail that extends in, for example, the X-direction by use of a driving device such as a motor.

The fifth direction changer 20F changes the direction of the bare optical fiber 3 by 90 degrees, as a result, the direction of the bare optical fiber 3 is in the downward vertical direction (sixth pathway L7).

The controller 130 can control the position of the second direction changer 20B and the fifth direction changer 20E (position in the X-direction) based on the measurement signal output from the measurement unit 50.

Next, a method according to a fourth embodiment of the invention will be described which manufactures an optical fiber in the case of using, for example, the manufacturing apparatus 1 D.

(Direction Change by use of Direction Changer)

The direction of the bare optical fiber 3 that is drawn from the optical fiber preform 2 in the downward vertical direction (first pathway L1) is changed by 90 degrees by the first direction changer 20A, as a result, the direction of the bare optical fiber 3 is in the horizontal direction (second pathway L2).

The direction of the bare optical fiber 3 is changed by 180 degrees by the second direction changer 20B, as a result, the direction of the bare optical fiber 3 is directed to the direction (third pathway L3) opposite to the second pathway L2. The direction of the bare optical fiber 3 is changed by 180 degrees by the third direction changer 20D, as a result, the direction (fourth pathway L5) opposite to the third pathway L3.

The direction of the bare optical fiber 3 is changed by 180 degrees by the fourth direction changer 20E, as a result, the direction of the bare optical fiber 3 is directed to the direction (fifth pathway L6) opposite to the fourth pathway L5. The direction of the bare optical fiber 3 is changed by 90 degrees by the fifth direction changer 20F, as a result, the direction of the bare optical fiber 3 is in the downward vertical direction (sixth pathway L7).

(Adjustment of Path Length of Bare Optical Fiber 3)

The measurement unit 50 measures an outer diameter of the optical fiber production intermediate 4 (i.e., an outer diameter of the coated layer) and outputs a measurement signal to the controller 130 based on the measurement value.

The controller 130 controls the positions of the second direction changer 20B and the fourth direction changer 20E in accordance with the measurement value of the outer diameter and thereby adjusts the path length of the bare optical fiber 3.

As a control method, feedback control such as PID control is preferable.

Particularly, in the case where the outer diameter of the coated layer of the optical fiber production intermediate 4 increases, the controller 130 disposes the second direction changer 20B and the fourth direction changer 20E at the positions close to the direction changers 20A, 20D, and 20F. In the case where the outer diameter of the coated layer of the optical fiber production intermediate 4 decreases, the controller 130 disposes the second direction changer 20B and the fourth direction changer 20E at the positions apart from the direction changers 20A, 20D, and 20F.

According to the manufacturing method, since the path length of the bare optical fiber 3 is adjusted by controlling the positions of the second direction changer 20B and the fourth direction changer 20E, the variation range in the path length of the bare optical fiber 3 increases.

Consequently, it is possible to carry out adjustment of the outer diameter of the coated layer with a high degree of responsiveness.

According to the manufacturing method, since it is possible to adjust the temperature of the bare optical fiber 3 in the direction changers 20A to 20F without varying the flow rate of the gas, it is possible to avoid the bare optical fiber 3 from being in contact with the inner side surface 21c of the guide groove 21 due to a lack of flotation of the bare optical fiber.

Figure 10:
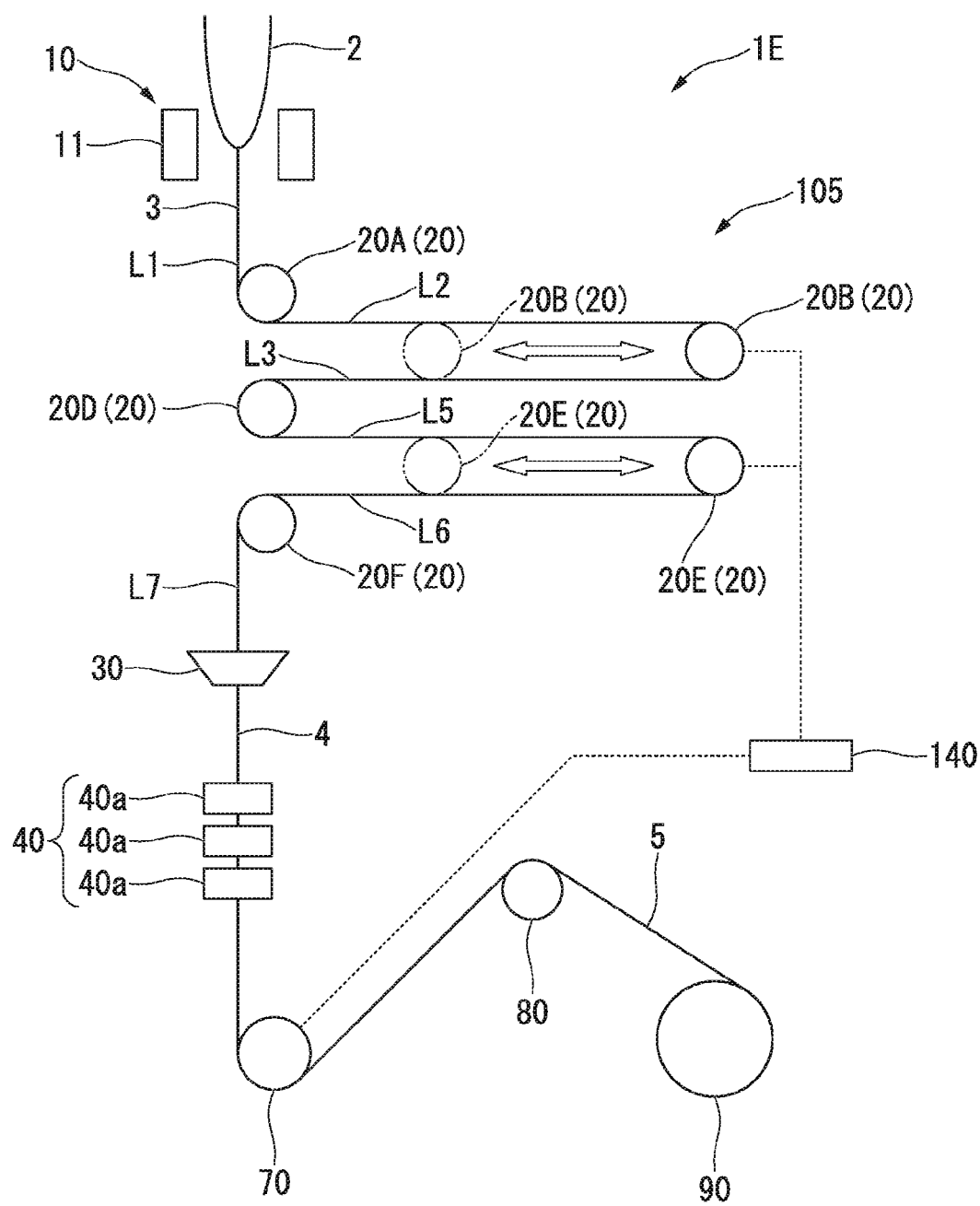
FIG. 10 is a schematic diagram showing the configuration of an optical fiber manufacturing apparatus according to a fifth embodiment of the invention.

FIG. 10 is a schematic diagram showing the configuration of a manufacturing apparatus 1E which serves as an optical fiber manufacturing apparatus according to a fifth embodiment of the invention. In FIG. 10, identical reference numerals are used for the elements which are identical to those of the above-described embodiment, and the explanations thereof are omitted or simplified here.

The manufacturing apparatus 1E includes the drawing unit 10, the direction changers 20 (20A, 20B, 20D, 20E, 20F), the coating unit 30, the curing unit 40, a controller 140, the pick-up unit 70, the pulley 80, and the winding unit 90. The direction changers 20, the controller 140, and the pick-up unit 70 constitute a control apparatus 105.

The controller 140 can controls the positions of the second direction changer 20B and the fourth direction changer 20E (position in the X-direction) based on the measurement signal output from the pick-up unit 70. Next, a method according to a fifth embodiment of the invention will be described which manufactures an optical fiber in the case of using, for example, the manufacturing apparatus 1E.

(Adjustment of Path Length of Bare Optical Fiber 3)

The pick-up unit 70 measures a drawing velocity of the optical fiber 5 and outputs a measurement signal to the controller 140 based on the measurement value.

The controller 140 controls the positions of the second direction changer 20B and the fourth direction changer 20E in accordance with the measurement value of the drawing velocity and thereby adjusts the path length of the bare optical fiber 3.

Particularly, in the case where the drawing velocity of the optical fiber 5 decreases, the controller 140 and disposes the second direction changer 20B and the fourth direction changer 20E at the positions close to the direction changers 20A, 20D, and 20F. In the case where the drawing velocity of the optical fiber 5 increases, the controller 140 disposes the second direction changer 20B and the fourth direction changer 20E at the positions apart from the direction changers 20A, 20D, and 20F.

According to the manufacturing method, since the path length of the bare optical fiber 3 is adjusted by controlling the positions of the second direction changer 2013 and the fourth direction changer 20E based on the measurement value of the drawing velocity of the optical fiber 5, it is possible to maintain the outer diameter of the coated layer within a constant range in the coating unit 30.

According to the manufacturing method, since it is possible to adjust the temperature of the bare optical fiber 3 in the direction changers 20A to 20F without varying the flow rate of the gas, it is possible to avoid the bare optical fiber 3 from being in contact with the inner side surface 21c of the guide groove 21 due to a lack of flotation of the bare optical fiber.

Figure 11:
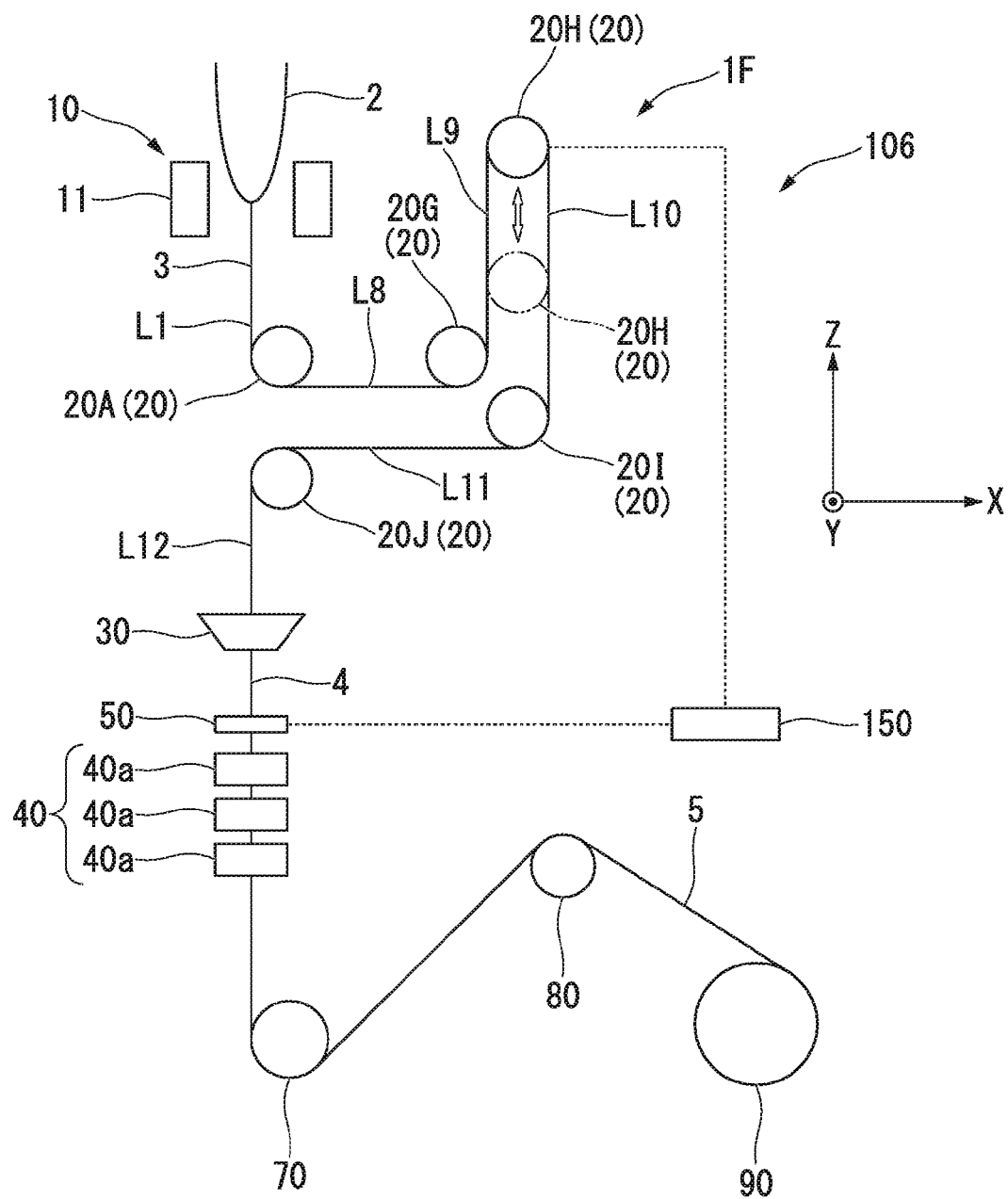
FIG. 11 is a schematic diagram showing the configuration of an optical fiber manufacturing apparatus according to a sixth embodiment of the invention.

FIG. 11 is a schematic diagram showing the configuration of a manufacturing apparatus IF which serves as an optical fiber manufacturing apparatus according to a sixth embodiment of the invention. In FIG. 11, identical reference numerals are used for the elements which are identical to those of the above-described embodiment, and the explanations thereof are omitted or simplified here.

The manufacturing apparatus 1F includes the drawing unit 10, the direction changers 20 (20A, 20G, 20H, 20I, 20J), the coating unit 30, the curing unit 40, the measurement unit 50, a controller 150, the pick-up unit 70, the pulley 80, and the winding unit 90.

The direction changers 20, the measurement unit 50, the controller 150 constitute a control apparatus 106.

The manufacturing apparatus 1F is different from the manufacturing apparatus 1A shown in FIG. 1 in that the manufacturing apparatus 1F includes a second direction changer 20G, a third direction changer 20H, a fourth direction changer 20I, and a fifth direction changer 20J instead of the second direction changer 20B and the third direction changer 20C.

The second direction changer 20G changes, by 90 degrees, the bare optical fiber 3 that is in the horizontal direction (second pathway L8) by the first direction changer 20A, as a result, the direction of the bare optical fiber 3 is in the upward vertical direction (third pathway L9).

The third direction changer 20H changes the direction of the bare optical fiber 3 by 180 degrees, as a result, the direction of the bare optical fiber 3 is in the downward vertical direction (fourth pathway L10) opposite to the third pathway L9.

The third direction changer 20H is movable in the direction in which the third direction changer comes close to or separates from the second direction changer 20G and the fourth direction changer 20I.

Particularly, the third direction changer 20H is movable in the vertical direction.

The fourth direction changer 20I changes the direction of the bare optical fiber 3 by 90 degrees, as a result, the direction of the bare optical fiber 3 is in the horizontal direction (fifth pathway L11).

The fifth direction changer 20J changes the direction of the bare optical fiber 3 by 90 degrees, as a result, the direction of the bare optical fiber 3 is in the downward vertical direction (sixth pathway L12).

The controller 150 can control the position of the third direction changer 20H (position in Z-direction) based on the measurement signal output from the measurement unit 50.

The Z-direction is perpendicular to both the X-direction and the Y-direction.

Next, a method according to a sixth embodiment of the invention will be described which manufactures an optical fiber in the case of using, for example, the manufacturing apparatus 1F.

(Direction Change by use of Direction Changer)

The direction of the bare optical fiber 3 that is drawn from the optical fiber preform 2 in the downward vertical direction (first pathway L1) is changed by 90 degrees by the first direction changer 20A, as a result, the direction of the bare optical fiber 3 is in the horizontal direction (second pathway L8).

The direction of the bare optical fiber 3 is changed by 90 degrees by the second direction changer 20G, as a result, the direction of the bare optical fiber 3 is in the upward vertical direction (third pathway L9). Furthermore, the direction of the bare optical fiber 3 is changed by 180 degrees by the third direction changer 20H, as a result, the direction of the bare optical fiber 3 is in the downward vertical direction (fourth pathway L10).

The direction of the bare optical fiber 3, is changed by 90 degrees by the fourth direction changer 20I, as a result, the direction of the bare optical fiber 3 is in the horizontal direction (fifth pathway L11). The direction of the bare optical fiber 3 is changed by 90 degrees by the fifth direction changer 20J, as a result, the direction of the bare optical fiber 3 is in the downward vertical direction (sixth pathway L12).

(Adjustment of Path Length of Bare Optical Fiber 3)

The measurement unit 50 measures an outer diameter of the optical fiber production intermediate 4 (i.e., an outer diameter of the coated layer) and outputs a measurement signal to the controller 150 based on the measurement value. The controller 150 controls the position in the vertical direction of the third direction changer 20H in accordance with the measurement value of the outer diameter and thereby adjusts the path length of the bare optical fiber 3.

According to the manufacturing method, since the path length of the bare optical fiber 3 is adjusted by controlling the position in the vertical direction of the third direction changer 20H, it is not necessary to ensure a large space in the X-direction in which the direction changer 20 is to be accommodated.

Accordingly, it is advantageous to reduce the manufacturing apparatus 1E in size.

According to the manufacturing method, since it is possible to adjust the temperature of the bare optical fiber 3 in the direction changers 20A to 20J without varying the flow rate of the gas, it is possible to avoid the bare optical fiber 3 from being in contact with the inner side surface 21c of the guide groove 21 due to a lack of flotation of the bare optical fiber.

EXAMPLES

Example 1

The manufacturing apparatus 1A shown in FIG. 1 was prepared.

As the first direction changer 20A and the third direction changer 20C, the direction changer 201 shown in FIG. 3 was used.

As the second direction changer 20B, the direction changer 203 shown in FIG. 5 was used.

A width of the guide groove 21 was 145 μm.

A flotation turning radius of the bare optical fiber 3 was approximately 62.5 mm.

Fluid which is to be introduced into the direction changers 20A and 2013 is air, and the temperature thereof was at a room temperature (approximately 24° C.).

The introduction flow rate of air into each of the first direction changer 20A and the third direction changer 20C was 100 liters per minute. An introduction flow rate of air into the second direction changer 20B was 200 liters per minute.

The first direction changer 20A was provided at the position at which the temperature of the bare optical fiber 3 becomes approximately 1000° C.

The bare optical fiber 3 (outer diameter of 125 μm) was obtained by drawing the optical fiber from the optical fiber preform 2 in the drawing unit 10.

As a drawing speed and a drawing tension, a common condition (drawing speed of 30 m/second and a drawing tension of approximately 150 gf) was adopted.

The direction of the bare optical fiber 3 that is drawn from the optical fiber preform 2 in the downward vertical direction (first pathway L1) is changed by the first direction changer 20A to be in the horizontal direction (second pathway L2). Subsequently, the direction of the bare optical fiber 3 is changed by 180 degrees by the second direction changer 20B, as a result, the direction of the bare optical fiber 3 is in the direction (third pathway L3) opposite to the second pathway L2. Furthermore, the direction of the bare optical fiber 3 is changed by 90 degrees by the third direction changer 20C, as a result, the direction of the bare optical fiber 3 is in the downward vertical direction (fourth pathway L4).

In the coating unit 30, the bare optical fiber 3 was subjected to a coating step using an ultraviolet curable resin, the UV lamp 40a irradiated the resin with ultraviolet light in the curing unit 40 and thereby a coated layer was cured, and the optical fiber 5 was obtained.

The optical fiber 5 passed through the pick-up unit 70 and the pulley 80 and was wound around the winding unit 90.

The measurement unit 50 measured an outer diameter of the optical fiber production intermediate 4 (i.e., an outer diameter of the coated layer) and outputs a measurement signal to the controller 60 based on the measurement value.

The controller 60 adjusted the path length of the bare optical fiber 3 by controlling the position of the second direction changer 20B in accordance with the measurement value of the outer diameter.

As a control method, PID control was used.

In the manufacturing method, flotation of the bare optical fiber 3 was stabilized in the direction changers 20A to 20C.

In the manufacture of the optical fiber, a drawing velocity of the optical fiber 5 varied at ±1 m/second; however, variation in the outer diameter of the coated layer was within ±1 μm, and the diameter was stabilized.

Thus, as a result of using the direction changers 20A to 20C, it was determined that the optical fiber 5 can be manufactured with a high level of yield without damage to the bare optical fiber 3.

Example 2

The manufacturing apparatus 1B shown in FIG. 7 was prepared.

The pick-up unit 70 measured a drawing velocity of the optical fiber 5 and carried out control such that: in the case where the drawing velocity of the optical fiber 5 decreases, the second direction changer 20B comes close to the first direction changer 20A and the third direction changer 20C; in the case where a drawing velocity of the optical fiber 5 increases, the second direction changer 20B moves separately from the first direction changer 20A and the third direction changer 20C.

In this Example, the optical fiber 5 was manufactured under the control condition described above, and the condition other than the above-described condition was the same as that of Example 1.

In the manufacturing method, flotation of the bare optical fiber 3 was stabilized in the direction changers 20A to 20C.

In the manufacture of the optical fiber, a drawing velocity of the optical fiber 5 varied at ±1 m/second; however, variation in the outer diameter of the coated layer was within ±1 μm, and the diameter was stabilized.

Thus, as a result of using the direction changers 20A to 20C, it was determined that the optical fiber 5 can be manufactured with a high level of yield without damage to the bare optical fiber 3.

Example 3

The manufacturing apparatus 1D shown in FIG. 9 was prepared.

The direction changer 201 shown in FIG. 3 was used as the direction changers 20A and 20F.

The direction changer 203 shown in FIG. 5 was used as the direction changers 20B, 20D, and 20E.

The first direction changer 20A was provided at the position at which the temperature of the bare optical fiber 3 becomes approximately 800° C.

The bare optical fiber 3 (outer diameter of 125 μm) was obtained by drawing the optical fiber from the optical fiber preform 2 in the drawing unit 10.

As a drawing speed and a drawing tension, a common condition (drawing speed of 40 m/second and a drawing tension of approximately 150 gf) was adopted.

The direction of the bare optical fiber 3 that is drawn from the optical fiber preform 2 in the downward vertical direction (first pathway L1) is changed by 90 degrees by the first direction changer 20A to be in the horizontal direction (second pathway L2). Subsequently, the direction of the bare optical fiber 3 is changed by 180 degrees by the second direction changer 20B, as a result, the direction of the bare optical fiber 3 is in the direction (third pathway L3) opposite to the second pathway L2. Furthermore, the direction of the bare optical fiber 3 is changed by 180 degrees by the third direction changer 20D, as a result, the direction of the bare optical fiber 3 is in the direction (fourth pathway L5) opposite to the third pathway L3.

The direction of the bare optical fiber 3 is changed by 180 degrees by the fourth direction changer 20E to be in the direction (fifth pathway L6) opposite to the fourth pathway L5. Subsequently, the direction of the bare optical fiber 3 is changed by 90 degrees by the fifth direction changer 20F to be in the downward vertical direction (sixth pathway L7).

In the coating unit 30, the bare optical fiber 3 was subjected to a coating step using an ultraviolet curable resin, the UV lamp 40a irradiated the resin with ultraviolet light in the curing unit 40 and thereby a coated layer was cured, and the optical fiber 5 was obtained.

The optical fiber 5 passed through the pick-up unit 70 and the pulley 80 and was wound around the winding unit 90.

The measurement unit 50 measured an outer diameter of the optical fiber production intermediate 4 (i.e., an outer diameter of the coated layer) and outputs a measurement signal to the controller 130 based on the measurement value.

The controller 130 adjusted the path length of the bare optical fiber 3 by controlling the positions of the second direction changer 20B and the fourth direction changer 20E in accordance with the measurement value of the outer diameter.

As a control method, PID control was used.

In the manufacturing method, flotation of the bare optical fiber 3 was stabilized in the direction changers 20A to 20F.

In the manufacture of the optical fiber, a drawing velocity of the optical fiber 5 varied at ±1 m/second; however, variation in the outer diameter of the coated layer was within ±1 μm, and the diameter was stabilized.

Thus, as a result of using the direction changers 20A to 20F, it was determined that the optical fiber 5 can be manufactured with a high level of yield without damage to the bare optical fiber 3.

Example 4

The manufacturing apparatus 1E shown in FIG. 10 was prepared.

The pick-up unit 70 measured a drawing velocity of the optical fiber 5 and carried out control such that: in the case where the drawing velocity of the optical fiber 5 decreases, the second direction changer 20B and the fourth direction changer 20E come close to the direction changers 20A, 20D, and 20F; in the case where a drawing velocity of the optical fiber 5 increases, the second direction changer 20B and the fourth direction changer 20E move separately from the direction changers 20A, 20D, and 20F.

In this Example, the optical fiber 5 was manufactured under the control condition described above, and the condition other than the above-described condition was the same as that of Example 1.

In the manufacturing method, flotation of the bare optical fiber 3 was stabilized in the direction changers 20A to 20F.

In the manufacture of the optical fiber, a drawing velocity of the optical fiber 5 varied at ±1 m/second; however, variation in the outer diameter of the coated layer was within ±1 μm, and the diameter was stabilized.

Thus, as a result of using the direction changers 20A to 20F, it was determined that the optical fiber 5 can be manufactured with a high level of yield without damage to the bare optical fiber 3.

Comparative Example 1

In this Comparative Example, an optical fiber 5 was manufactured under the same condition as that of Example 1 except that the adjustment of the path length of the bare optical fiber 3 due to control of the position of the second direction changer 20B is not carried out.

In the manufacturing method, it was determined that the outer diameter of the coated layer is varied at approximately ±5 μm, and stabilized coating cannot be realized.

Comparative Example 2

In this Comparative Example, an optical fiber 5 was manufactured under the condition of Example 4 except that the adjustment of the path length of the bare optical fiber 3 due to control of the positions of the second direction changer 20B and the fourth direction changer 20E is not carried out.

In the manufacturing method, it was determined that the outer diameter of the coated layer is varied at approximately ±5 μm, and stabilized coating cannot be realized.

In the above-description, a method of manufacturing an optical fiber of the invention and an optical fiber manufacturing apparatus thereof are described; however, the technical scope of the invention is not limited to the above embodiments, and various modifications may be made without departing from the scope of the invention.

What is claimed is:

1. A method of manufacturing an optical fiber, comprising:
   preparing two fixed direction changers and a movable direction changer located between the two fixed direction changers, each of which comprises a guide groove and an outlet nozzle, the guide groove being configured to guide a bare optical fiber, the bare optical fiber being arranged along and introduced into the guide groove, the outlet nozzle being formed in the guide groove and being configured to cause the bare optical fiber to float, one of the fixed direction changers, the movable direction changer, and the other of the fixed direction changers located in order from an upstream side to a downstream side in a fiber drawing direction from a drawing unit to a coating unit, the movable direction changer being movable in a direction in which the movable direction changer comes close to or separates from the two fixed direction changers;
   drawing the bare optical fiber from an optical fiber preform, thereby forming the bare optical fiber;
   providing a coated layer made of a resin on a periphery of the bare optical fiber;
   obtaining an optical fiber by curing the coated layer;
   changing a direction of the bare optical fiber at a position between: a position at which the bare optical fiber is formed; and a position at which the coated layer is provided on the periphery of the bare optical fiber, by use of the two fixed direction changers and the movable direction changer;
   measuring an outer diameter of the coated layer;
   adjusting a length of the bare optical fiber from the drawing unit to the coating unit by controlling a position of the movable direction changer so as to come close to the positions of the two fixed direction changers, based on a measurement value of the outer diameter of the coated layer, the drawing unit forming the bare optical fiber, the coating unit providing the coated layer on the periphery of the bare optical fiber; and
   moving the movable direction changer and thereby stabilizing the outer diameter of the coated layer from increasing, control being carried out so that the movable direction changer approaches the two fixed direction changers, the movable direction changer is thereby disposed at a position close to the two fixed direction changers, a path length of the bare optical fiber decreases accordingly, a temperature of the bare optical fiber which is to be introduced into the coating unit relatively increases, a thickness of the coated layer formed in the coating unit decreases, the outer diameter of the coated layer decreases.

2. The method according to claim 1, further comprising:
   preparing a controller and a measurement unit, the measurement unit being capable of measuring the outer diameter of the coated layer and being configured to output a measurement signal to the controller based on the measurement value of the outer diameter of the coated layer, wherein
   the controller controls a position of the movable direction changer based on the measurement signal output from the measurement unit and thereby adjusts the length of the bare optical fiber from the drawing unit to the coating unit.

3. A method of manufacturing an optical fiber, comprising:
   preparing two fixed direction changers and a movable direction changer located between the two fixed direction changers, each of which comprises a guide groove and an outlet nozzle, the guide groove being configured to guide a bare optical fiber, the bare optical fiber being arranged along and introduced into the guide groove, the outlet nozzle being formed in the guide groove and being configured to cause the bare optical fiber to float, one of the fixed direction changers, the movable direction changer, and the other of the fixed direction changers located in order from an upstream side to a downstream side in a fiber drawing direction from a drawing unit to a coating unit, the movable direction changer being movable in a direction in which the movable direction changer comes close to or separates from the two fixed direction changers;
   drawing the bare optical fiber from an optical fiber preform, thereby forming the bare optical fiber;
   providing a coated layer made of a resin on a periphery of the bare optical fiber;
   obtaining an optical fiber by curing the coated layer;
   changing a direction of the bare optical fiber at a position between: a position at which the bare optical fiber is formed; and a position at which the coated layer is provided on the periphery of the bare optical fiber, by use of the two fixed direction changers and the movable direction changer;
   measuring an outer diameter of the coated layer;
   adjusting a length of the bare optical fiber from the drawing unit to the coating unit by controlling a position of the movable direction changer so as to separate from the positions of the two fixed direction changers, based on a measurement value of the outer diameter of the coated layer, the drawing unit forming the bare optical fiber, the coating unit providing the coated layer on the periphery of the bare optical fiber; and
   moving the movable direction changer and thereby stabilizing the outer diameter of the coated layer from decreasing, control being carried out so that the movable direction changer moves separately from two fixed direction changers, the movable direction changer is thereby disposed at a position apart from the two fixed direction changers, a path length of the bare optical fiber increases accordingly, a temperature of the bare optical fiber which is to be introduced into the coating unit relatively decreases, a thickness of the coated layer formed in the coating unit increases, the outer diameter of the coated layer increases.

4. The method according to claim 3, further comprising:

preparing a controller and a measurement unit, the measurement unit being capable of measuring the outer diameter of the coated layer and being configured to output a measurement signal to the controller based on the measurement value of the outer diameter of the coated layer, wherein the controller controls a position of the movable direction changer based on the measurement signal output from the measurement unit and thereby adjusts the length of the bare optical fiber from the drawing unit to the coating unit.

* * * * *